(12) United States Patent
Kobayashi

(10) Patent No.: US 10,634,980 B2
(45) Date of Patent: Apr. 28, 2020

(54) PHOSPHOR HOLDER, LIGHT SOURCE DEVICE, AND PROJECTION TYPE DISPLAY DEVICE INCLUDING LIGHT SOURCE DEVICE

(71) Applicant: NEC Display Solutions, Ltd., Tokyo (JP)

(72) Inventor: Terumasa Kobayashi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 93 days.

(21) Appl. No.: 16/076,646

(22) PCT Filed: Aug. 31, 2016

(86) PCT No.: PCT/JP2016/075530
§ 371 (c)(1),
(2) Date: Aug. 8, 2018

(87) PCT Pub. No.: WO2018/042564
PCT Pub. Date: Mar. 8, 2018

(65) Prior Publication Data
US 2019/0049829 A1   Feb. 14, 2019

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2013* (2013.01)

(58) Field of Classification Search
None
See application file for complete search history.

(56) References Cited

U.S. PATENT DOCUMENTS

2017/0293211 A1* 10/2017 Kobayashi ............ G03B 21/00

FOREIGN PATENT DOCUMENTS

| JP | 2007-163653 A | 6/2007 |
|----|---------------|--------|
| JP | 2013-097233 A | 5/2013 |
| JP | 2015-166804 A | 9/2015 |
| WO | WO 2016/075853 A1 | 5/2016 |
| WO | WO 2016/116975 A1 | 5/2016 |

OTHER PUBLICATIONS

International Search Report (ISR) (PCT Form PCT/ISA/210), in PCT/JP2016/075530, dated Nov. 22, 2016.
Japanese Office Action, dated Aug. 20, 2019, in Japanese Application No. 2018-536593 and English Translation thereof.

* cited by examiner

*Primary Examiner* — Elmito Breval
(74) *Attorney, Agent, or Firm* — McGinn IP Law Group, PLLC.

(57) ABSTRACT

A phosphor holder includes: a rectangular flat plate-like pedestal; a plurality of phosphor holder attachment surfaces provided at a plurality of points, respectively, on an outer peripheral section of the pedestal and protruding in a first direction by a predetermined height with respect to surroundings; a base mounted substantially in a center of a surface of the pedestal facing in the first direction; a motor mounted on the base and having a rotating shaft substantially orthogonal to an in-plane direction of the pedestal; a phosphor wheel on which a phosphor is formed and that is rotated by the motor; and a plurality of adjustment shims mounted on the plurality of phosphor wheel attachment surfaces and brought into contact with the holder attachment surface.

12 Claims, 8 Drawing Sheets

[Fig. 1]
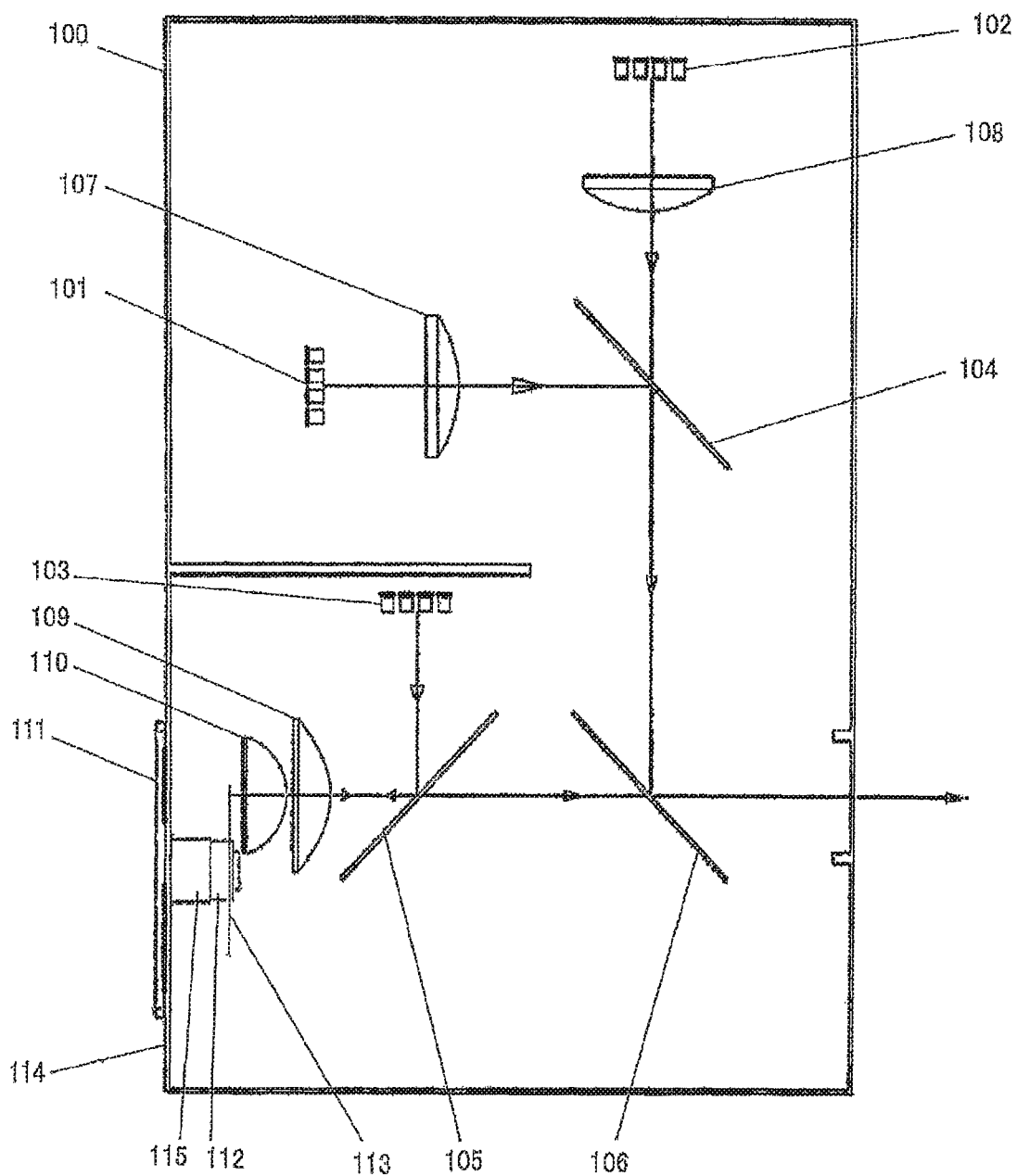

[Fig. 2]
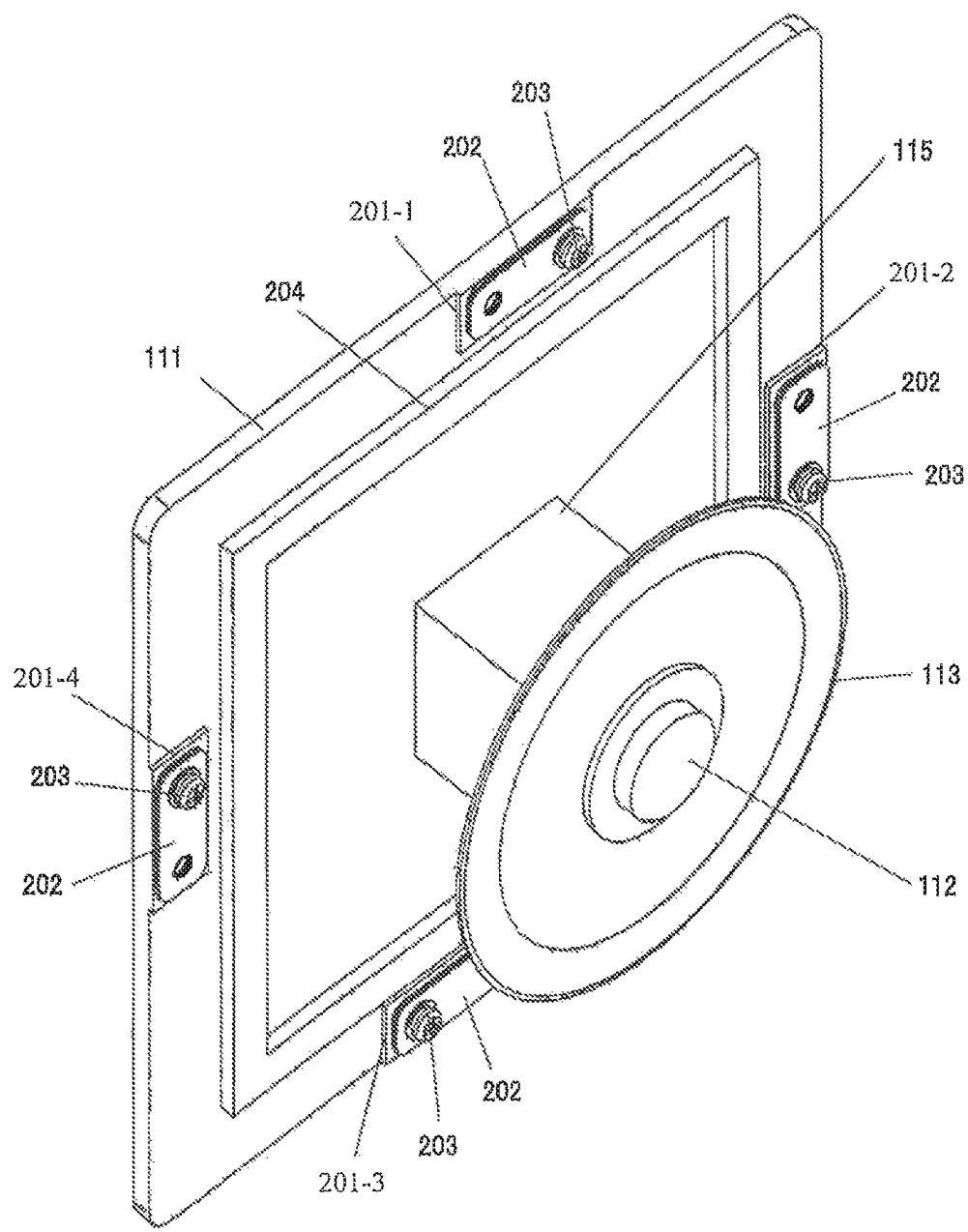

[Fig. 3]
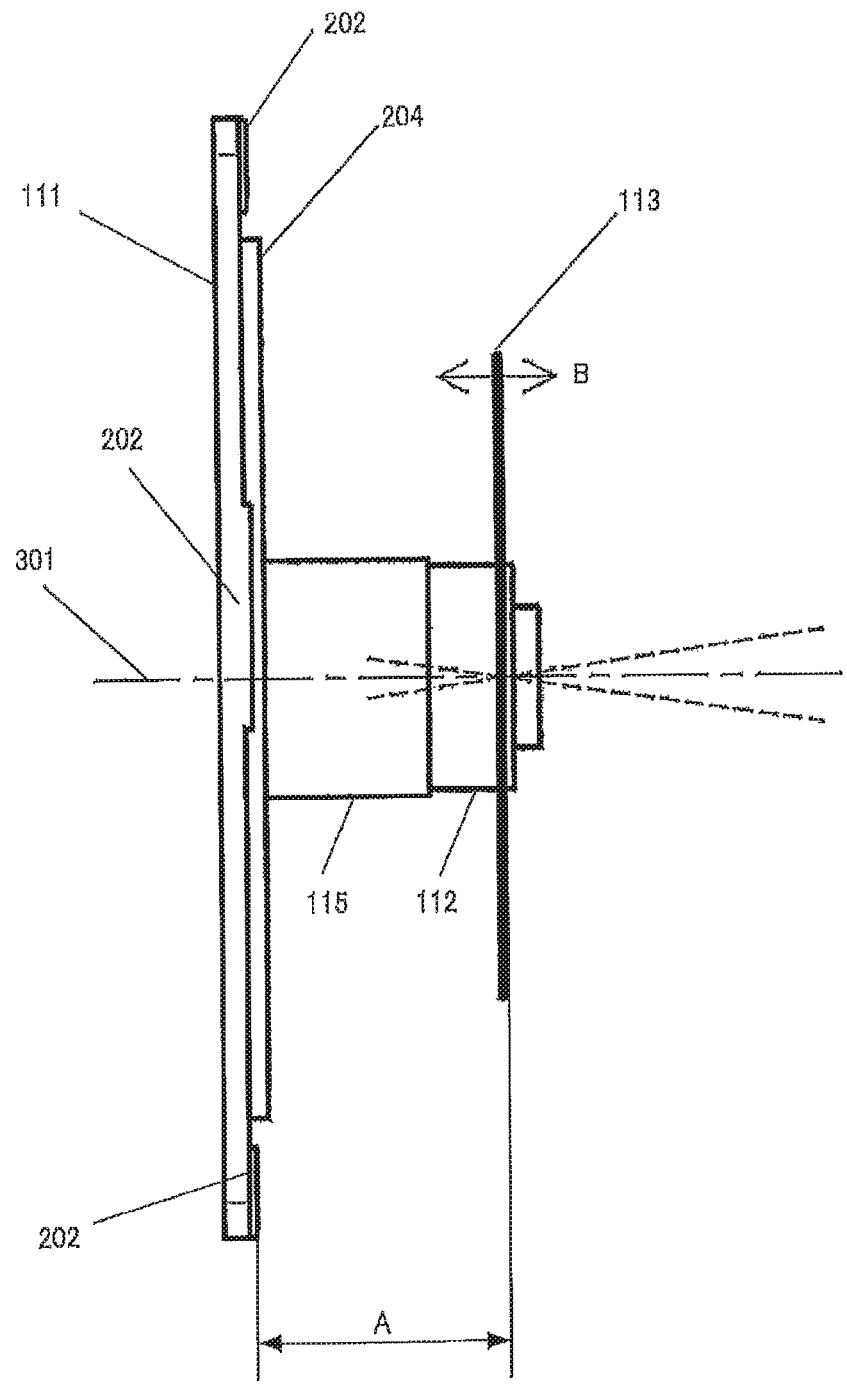

[Fig. 4]
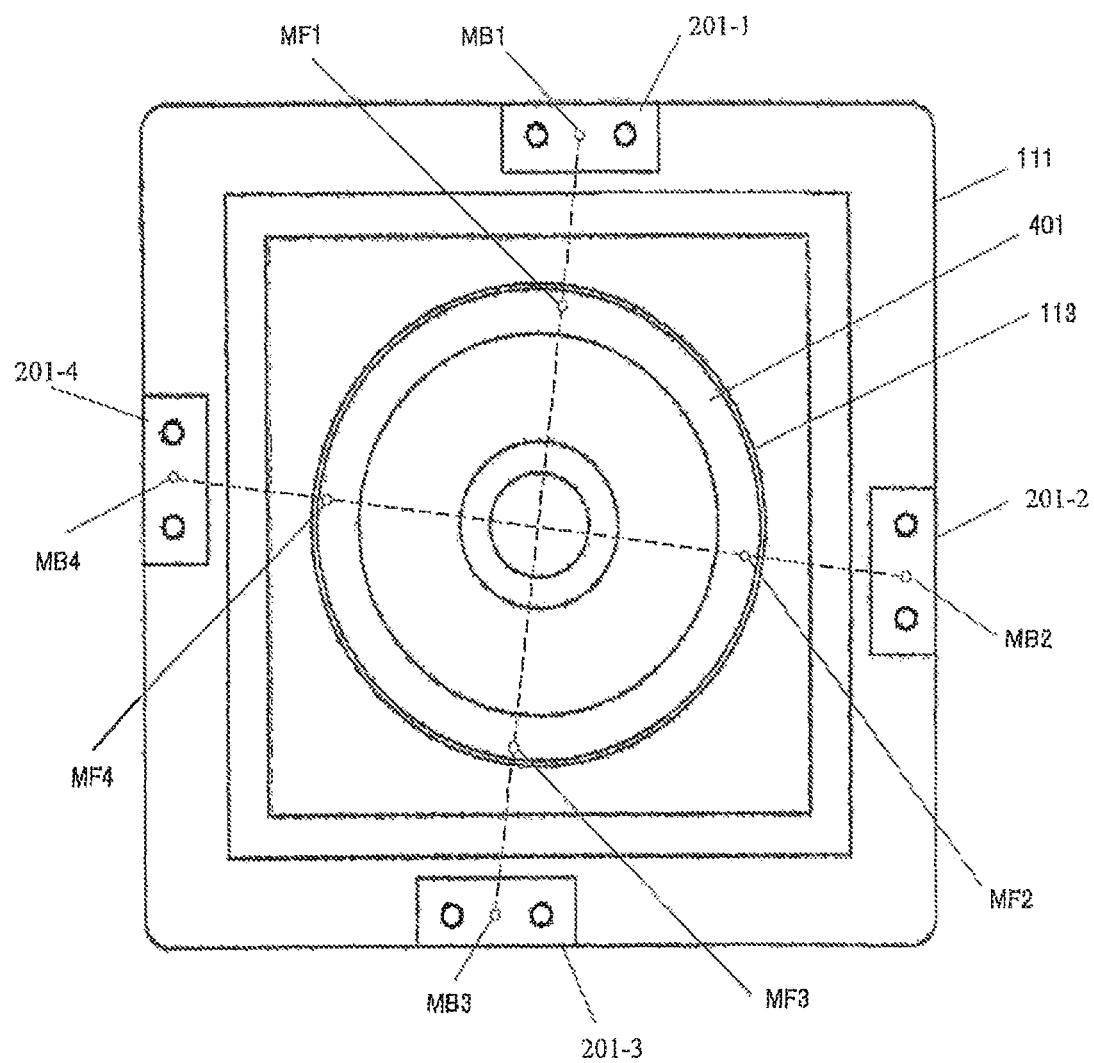

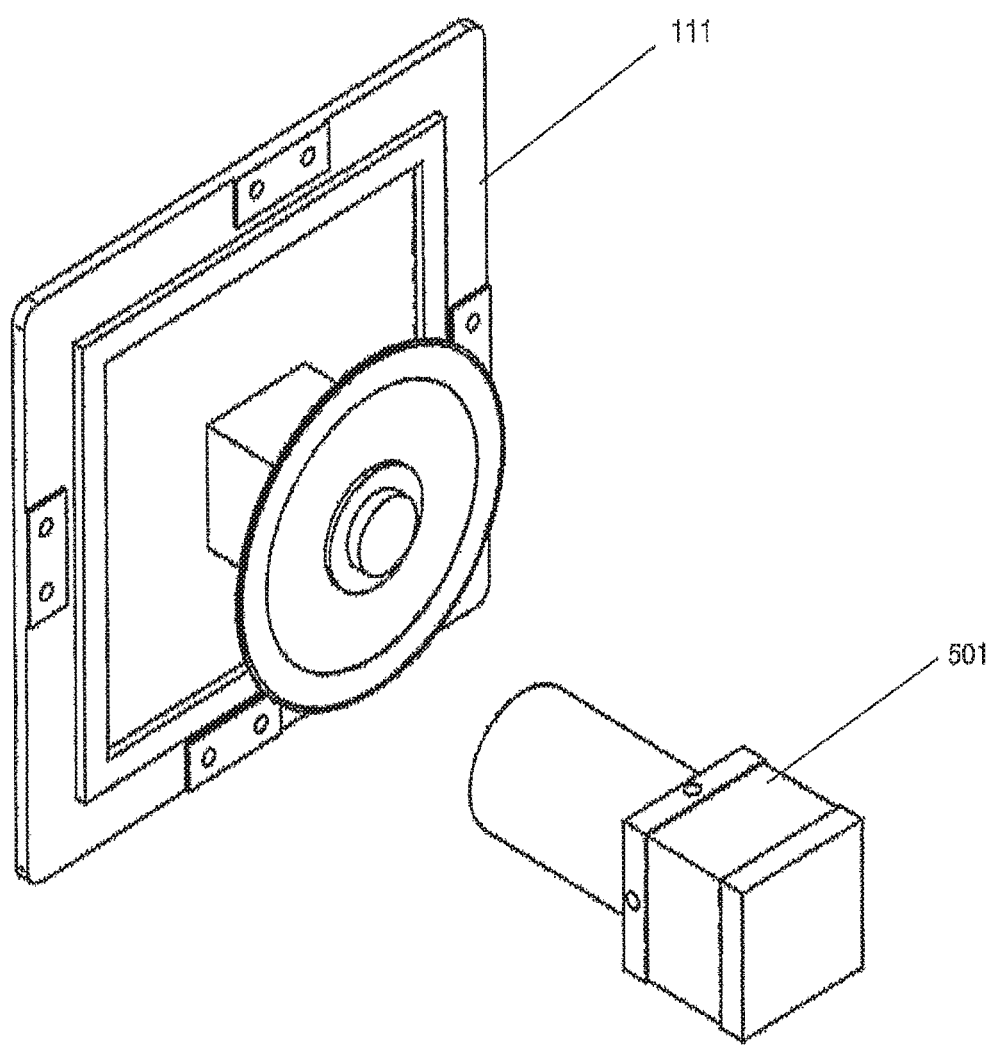

[Fig. 6]
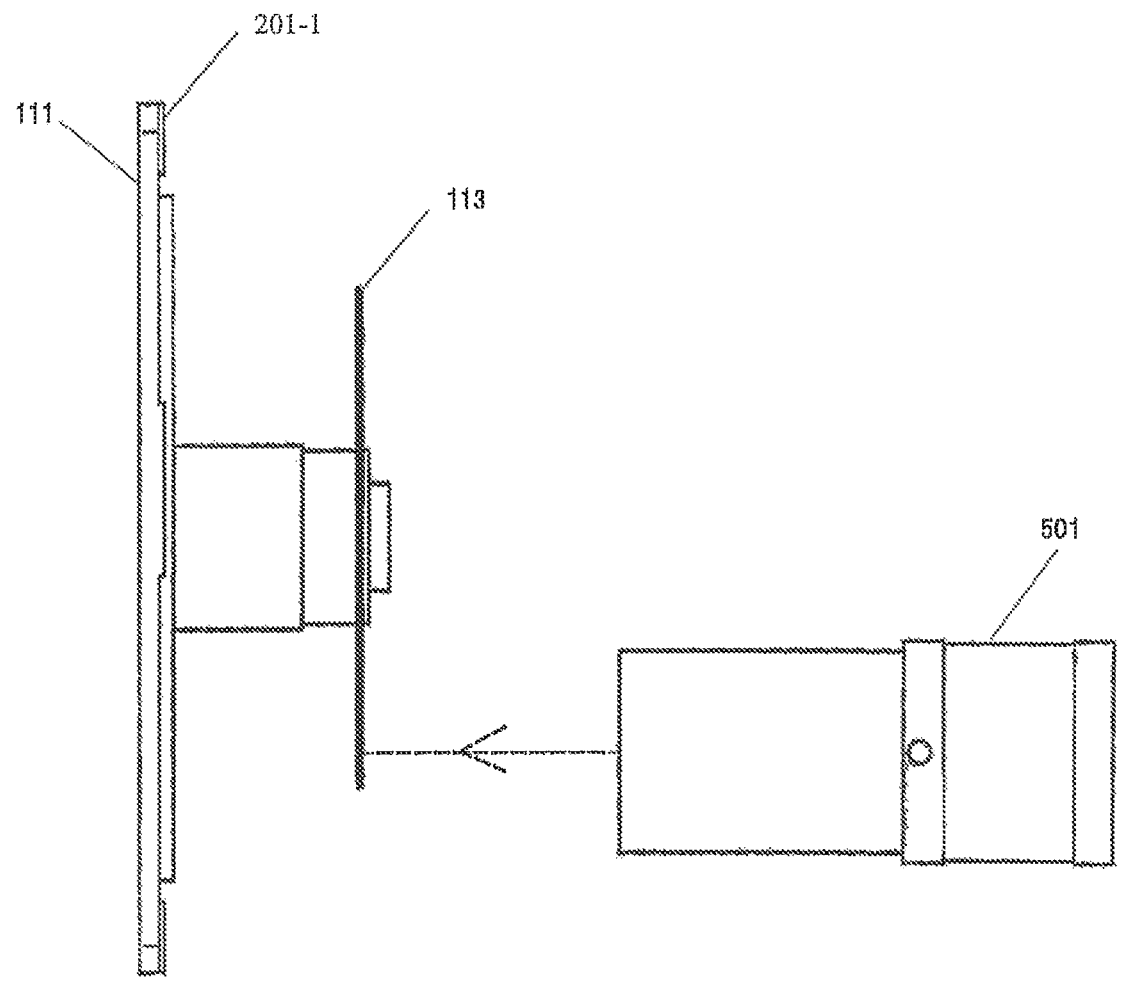

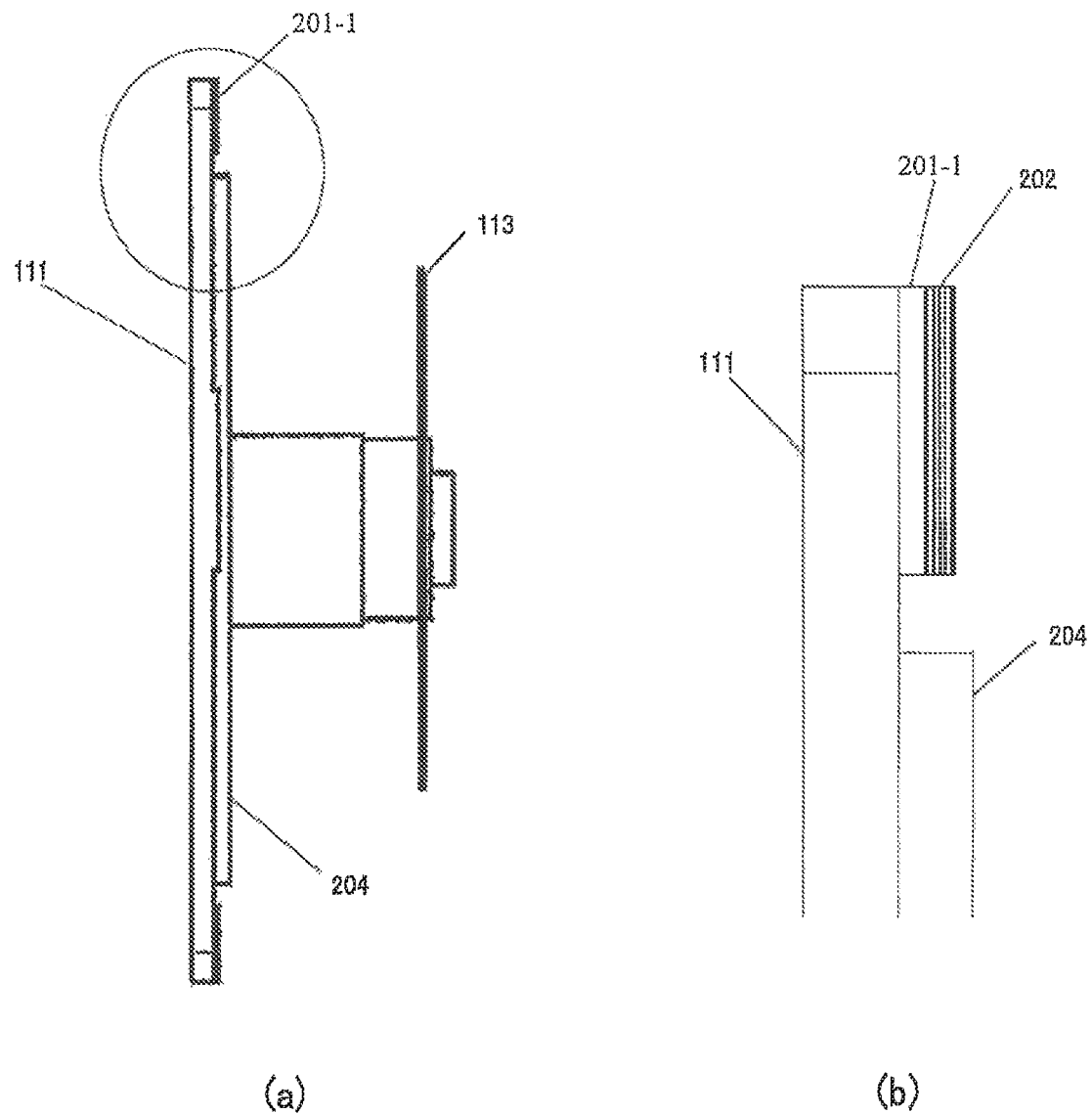
[Fig. 7]
(a)    (b)

[Fig. 8]
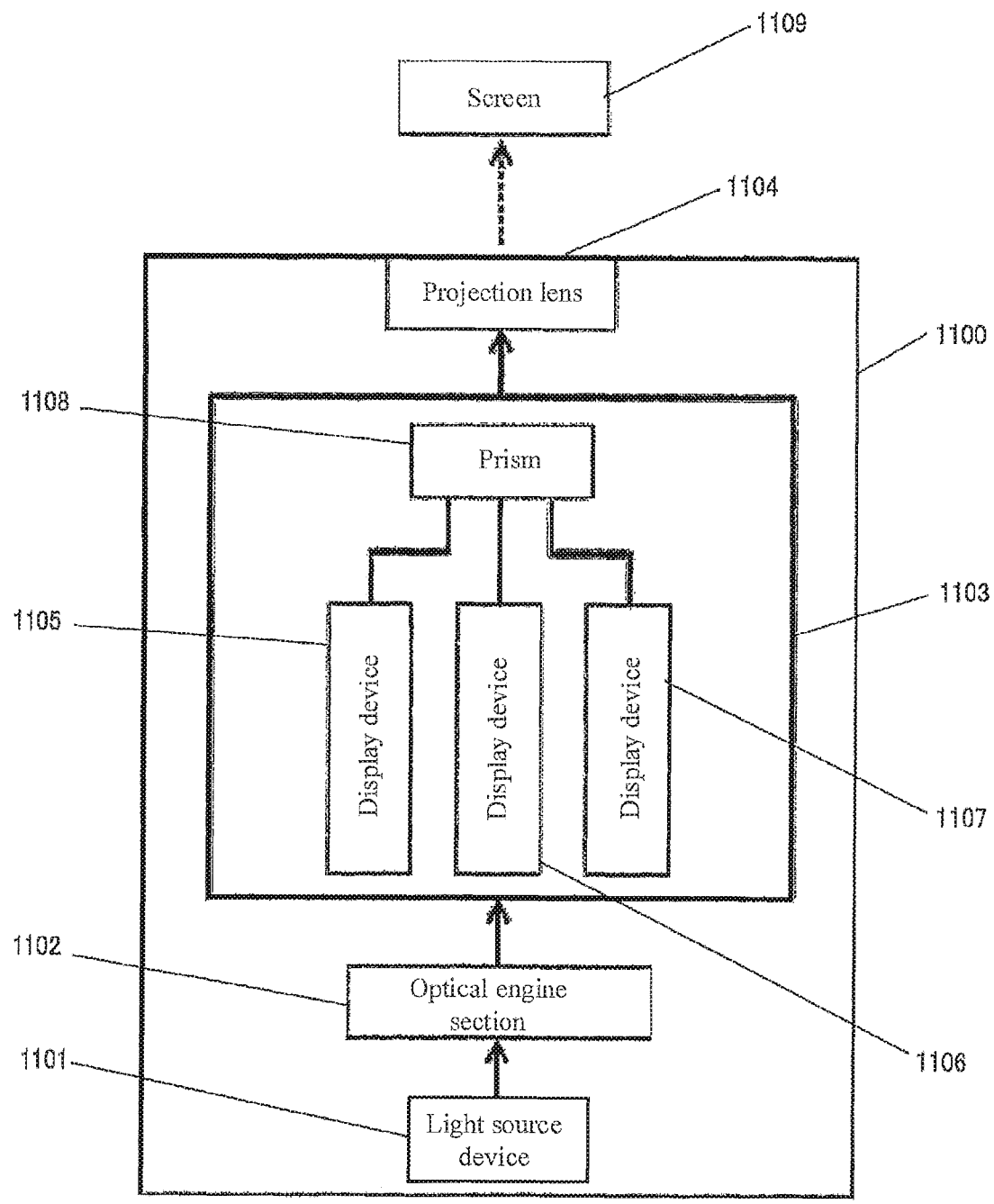

PHOSPHOR HOLDER, LIGHT SOURCE DEVICE, AND PROJECTION TYPE DISPLAY DEVICE INCLUDING LIGHT SOURCE DEVICE

TECHNICAL FIELD

The present invention relates to a phosphor holder, a light source device, and a projection type display device including the light source device.

BACKGROUND ART

A projection type display device that projects an image has been known. It is proposed to use a light source device including a laser light source for a projection type display device.

A light source device disclosed in Patent Literature 1 (JP 2015-166804A) includes a first laser light source that emits laser light, a fluorescent unit that generates fluorescence by laser light emitted from a second laser light source, and a light condensing element that combines the laser light emitted from the first laser light source and the fluorescence generated in the fluorescent unit and outputs the combined light.

The narrower the space between the fluorescent unit and the light condensing element, the larger is the amount of fluorescence that reaches the light condensing element. In order to attach the fluorescent unit to a pedestal in such a state that the fluorescent unit and the light condensing element are located closer to each other and prevent contact between the fluorescent unit and the light condensing element, Patent Literature 1 discloses a configuration including a pedestal on which a light condensing element is fixed; a fluorescent unit; and a guide member, wherein the fluorescent unit is detachably attached to the pedestal, and the guide member enables positioning of the fluorescent unit with respect to the pedestal among a first position and second and third positions at which the fluorescent unit is closer to the light condensing element than at the first position. The guide member includes a first guide part, a second guide part, and a third guide part. The first guide part guides the fluorescent unit to the first position and the second position. The second guide part guides the fluorescent unit to the second position and the third position, and restricts the fluorescent unit guided to the second position and the third position from approaching the light condensing element. The third guide part restricts the fluorescent unit guided to the third position from moving away from the light condensing element.

CITATION LIST

Patent Literature

Patent Literature 1: JP 2015-166804A

DISCLOSURE OF THE INVENTION

Problem to be Solved by the Invention

Fluorescence is generated by irradiating a phosphor formed on a phosphor wheel with laser light as excitation light. If a formation surface on which the phosphor is formed is not perpendicular to the incident excitation light, the emission direction of the generated fluorescence varies. As a result, the intensity of output light of a light source device in which the fluorescence is combined fluctuates and the ratio of the fluorescence in the output light fluctuates, and therefore the hue of the output light also fluctuates and the hue of image light of a projection type display device using the light source device also fluctuates.

In the light source device disclosed in Patent Literature 1, it is possible to attach the fluorescent unit to the pedestal in a state in which the fluorescent unit and the light condensing element are located closer to each other and prevent contact between the fluorescent unit and the light condensing element. However, Patent Literature 1 does not particularly disclose a structure for arranging the formation surface on which the phosphor is formed to be perpendicular to the incident excitation light.

The present invention realizes a phosphor holder that arranges a formation surface on which a phosphor is formed to be perpendicular to the incident excitation light, a light source device, and a projection type display device including the light source device.

Means for Solving the Problem

A phosphor holder according to the present invention is a phosphor holder that is attached to a holder attachment surface of a light source device, and includes:
a pedestal;
a plurality of phosphor holder attachment surfaces that are provided at a plurality of points on an outer peripheral section of the pedestal and that protrude in a first direction by a predetermined height with respect to surroundings;
a base that is mounted substantially in a center of a surface of the pedestal facing in the first direction;
a motor that is mounted on the base and that has a rotating shaft substantially orthogonal to an in-plane direction of the pedestal;
a phosphor wheel on which a phosphor is formed and that is rotated by the motor, and
a plurality of adjustment shims that are mounted on the plurality of phosphor holder attachment surfaces and that are brought into contact with the holder attachment surface.

A light source device of the present invention is a light source device including a holder attachment surface to which the phosphor holder is attached, wherein the holder attachment surface is formed with an opening that allows insertion of the phosphor wheel and is smaller than the cushion.

A projection type display device according to the present invention includes the above light source device.

Effect of the Invention

In the present invention with the above configuration, it is possible to arrange the formation surface on which the phosphor is formed to be perpendicular to the incident excitation light.

BRIEF DESCRIPTION OF THE DRAWINGS

FIG. 1 is a schematic diagram showing a configuration of an example embodiment of light source device 100 according to the present invention.

FIG. 2 is a perspective view showing a configuration of phosphor holder 111 in FIG. 1.

FIG. 3 is a diagram showing the attached state of phosphor wheel 113 in FIG. 2.

FIG. 4 is a diagram for explaining a method of determining the thickness of adjustment shim 202.

FIG. 5 is a diagram for explaining the method of determining the thickness of adjustment shim 202.

FIG. 6 is a diagram for explaining the method of determining the thickness of adjustment shim 202.

FIG. 7 is a diagram for explaining the method of determining the thickness of adjustment shim 202, wherein FIG. 7(a) is a side view of phosphor holder 111 when attached and FIG. 7(b) is a side view showing, by enlargement, a state in the vicinity of phosphor holder attachment surface 201-1.

FIG. 8 is a block diagram showing a configuration of an example embodiment of a projection type display device including a light source device shown in a first example embodiment.

EXAMPLE EMBODIMENTS

Next, example embodiments will be described with reference to the drawings.

First Example Embodiment

FIG. 1 is a schematic diagram showing a configuration of an example embodiment of light source device 100 according to the present invention. As shown in FIG. 1, light source device 100 includes blue laser light source 101, red laser light source 102, blue laser light source 103, dichroic mirrors 104 to 106, condenser lenses 107 to 110, phosphor holder 111, motor 112, and phosphor wheel 113.

Blue laser light emitted from laser light source 101 travels toward dichroic mirror 104 through condenser lens 107, and red laser light emitted from laser light source 102 travels toward dichroic mirror 104 through condenser lens 108. Dichroic mirror 104 serves to reflect blue light and transmits red light. The blue laser light emitted from laser light source 101 and the red laser light emitted from laser light source 102 are combined by dichroic mirror 104 and travel toward dichroic mirror 106.

Laser light source 103 is a laser light source for excitation, and emits blue laser light as excitation light toward dichroic mirror 105. Dichroic mirror 105 serves to reflect blue light and transmits green light. The blue laser light emitted from laser light source 103 is reflected by dichroic mirror 105, and is incident as excitation light on phosphor wheel 113 through condenser lenses 109 and 110. A phosphor (not shown) is formed on a surface of phosphor wheel 113 on which the blue laser light emitted from laser light source 103 is incident. The phosphor generates green fluorescence by irradiation of excitation light, and the green fluorescence generated and emitted from phosphor wheel 113 travels toward dichroic mirror 106 through condenser lenses 110, 109 and dichroic mirror 105.

Dichroic mirror 106 serves to reflect blue light and red light and transmit green light. The blue laser light emitted from laser light source 101, the red laser light emitted from laser light source 102 and the green fluorescence emitted from phosphor wheel 113 are combined by dichroic mirror 106 and emitted to the outside of light source device 100. Thus, dichroic mirrors 104 to 106 and condenser lenses 107 to 110 function as a combining optical system.

Phosphor wheel 113 is rotated by motor 112, and motor 112 is attached to base 115 on phosphor holder 111. Thus, base 115, motor 112, and phosphor wheel 113 are integrally attached to phosphor holder 111. Phosphor holder 111 is detachably attached to holder attachment surface 114, which is a part of a housing of light source device 100, using an attachment member such as screws.

FIG. 2 is a perspective view showing a configuration of phosphor holder 111.

Phosphor holder 111 includes base 115 at a substantially center portion of pedestal 205 which is a rectangular flat plate member, and phosphor holder attachment surfaces 201-1 to 201-4 provided on an outer peripheral section in the vicinity of substantially the center of each side of pedestal 205 and protruding by a predetermined height with respect to surroundings. In other words, the plurality of phosphor holder attachment surfaces 201-1 to 201-4 are disposed around the center of phosphor wheel 113. Adjustment shims 202 that adjust thickness are attached to phosphor holder attachment surfaces 201-1 to 201-4 by shim fastening screws 203. Further, cushion 204 in the shape of a frame slightly smaller than the pedestal of phosphor holder 111 is attached around base 115.

Formed in holder attachment surface 114 shown in FIG. 1 is an opening (not shown) that allows insertion of phosphor wheel 113 and is smaller than cushion 204.

Cushion 204 has deformable elasticity and is provided to prevent entry of dust or dirt into light source device 100 and entry of stray light into light source device 100 from a gap between holder 111 and phosphor holder attachment surface 114 when holder 111 is attached to phosphor holder attachment surface 114.

As described above, in the light source device that combines fluorescence generated using the phosphor wheel with other laser light, it is important to arrange that the formation surface on which the phosphor is formed is perpendicular to the incident excitation light in order to stabilize the intensity and hue of output light of the light source device.

FIG. 3 is a diagram showing the attached state of phosphor wheel 113.

Phosphor wheel 113 is attached to motor 112 so that the incident surface of the laser light emitted from laser light source 103 as excitation light is perpendicular to rotating shaft 301 of motor 112 indicated by the alternate long and short dash line. According to the design specifications of light source device 100 of the present example embodiment, the optical axis of the laser light emitted from laser light source 103 to be incident on phosphor wheel 113 is parallel to rotating shaft 301 of motor 112, and, in this state, the fluorescence and the laser light from the other laser light sources shown in FIG. 1 are stably combined. An in-plane direction of phosphor wheel 113 is ideally parallel to an in-plane direction of pedestal 205. Actually, however, phosphor wheel 113 is attached to motor 112 and motor 112 is attached to base 115, and therefore light source device 100 is fabricated so that the laser light emitted from laser light source 103 is incident perpendicularly to pedestal 205 on which base 115 is mounted and further, is incident perpendicularly to holder attachment surface 114 to which pedestal 205 is attached.

As shown in FIG. 3, phosphor holder 111 is attached to holder attachment surface 114 of light source device 100. In this case, if the distance between pedestal 205 and the excitation light incident surface of phosphor wheel 113 and, similarly to this distance, if distance A between phosphor holder attachment surfaces 201-1 to 201-4 and the excitation light incident surface of phosphor wheel 113 is constant at any point of phosphor wheel 113, the excitation light is perpendicularly incident on the incident surface of phosphor wheel 113. In practice, to obtain accuracy, it is necessary to make a deviation from a designed value fall within a range of ±0.2 mm at any point of phosphor wheel 113, and if phosphor wheel 113 fluctuates beyond this range as shown by arrow B and an output direction of the generated fluorescence fluctuates as shown by the broken lines, there is a risk that the output of light source device 100 fluctuates largely. Although this fluctuation is caused by the inclination of phosphor wheel 113 with respect to pedestal 205, if the distance between phosphor wheel 113 and condenser lens 110 is changed from the designed value, the intensity of the output light also fluctuates.

Phosphor wheel 113 is attached to motor 112 mounted on base 115 of phosphor holder 111. However, since base 115 and motor 112 themselves have errors of about ±0.7 mm, adjustments are necessary to cancel the errors and make the excitation light incident surface of phosphor wheel 113 perpendicular to the excitation light. In the present example embodiment, the above adjustments are made by adjustment shims 202.

FIG. 4 to FIG. 7 are diagrams for explaining a method of determining a thickness of adjustment shim 202 which is performed in the present example embodiment. First, distance A between phosphor holder attachment surfaces 201-1 to 201-4 and the excitation light incident surface of phosphor wheel 113 shown in FIG. 3 is measured at a plurality of points.

FIG. 4 is a diagram showing the points where distance A is measured. Measurement of distance A is performed with respect to phosphor holder attachment surfaces 201-1 to 201-4 provided at four points.

As shown in the perspective view of FIG. 5 and the side view of FIG. 6, the distance is measured using laser measurement device 501. Laser measurement device 501 measures the distance by perpendicularly irradiating pedestal 205 with laser light for distance measurement.

As shown in FIG. 4, phosphor 401 is formed on the outer peripheral section of phosphor wheel 113. As a measurement procedure, for phosphor holder attachment surface 201-1, distance AMB1 from laser measurement device 501 to measurement point MB1 which is substantially a center portion of phosphor holder attachment surface 201-1 is measured. Next, laser measurement device 501, or pedestal 205, is moved to a position immediately above measurement point MF1, which is on a straight line connecting substantially a center portion of phosphor wheel 113 and measurement point MB1 and on phosphor 401, and distance AMF1 from laser measurement device 501 to measurement point MF1 is measured. Subsequently, distance A1 which is the difference between distance AMB1 and distance AMF1 is obtained. Thereafter, distances A2 to A4 about phosphor holder attachment surfaces 201-2 to 201-4 are obtained by the same procedure.

Next, based on the measurement results of distances A1 to A4, thicknesses of the adjustment shims are determined so that the distance from pedestal 205 in the vicinity of each of phosphor holder attachment surfaces 201-1 to 201-4 to the excitation light incident surface of phosphor wheel 113 is uniform and equal to the designed value. For example, when the designed value from pedestal 205 to the excitation light incident surface of phosphor wheel 113 is 50 mm, the height of each of phosphor holder attachment surfaces 201-1 to 201-4 is 2 mm and distances A1 to A4 are 47.5 mm, 47.6 mm, 47.7 mm and 47.8 mm, respectively, adjustment shims 202 with heights of 0.5 mm, 0.4 mm, 0.3 mm, and 0.2 mm, respectively, are attached to phosphor holder attachment surfaces 201-1 to 201-4, respectively, by shim fastening screws 203, and phosphor holder 111 is in the state shown in FIG. 2. Note that each adjustment shim 202 is actually a combination of a shim having a thickness of 0.5 mm and a shim having a thickness of 0.1 mm, and one piece of 0.5 mm-thick shim is used for phosphor holder attachment surface 201-1 and four to two pieces of 0.1 mm-height shim are used for phosphor holder attachment surfaces 201-2 to 201-4 and attached collectively by shim fastening screws 203.

After attaching adjustment shims 202, phosphor holder 111 is attached to holder attachment surface 114 of light source device 100 as shown in FIG. 1. FIG. 7(a) is a side view of phosphor holder 111 when attached, and FIG. 7(b) is a side view showing, by enlargement, a state in the vicinity of phosphor holder attachment surface 201-1.

Phosphor holder attachment surfaces 201-1 to 201-4 of phosphor holder 111 are in contact with holder attachment surface 114. The contact state is explained by taking phosphor holder attachment surface 201-1 as an example with reference to FIG. 7(b). Shim fastening screw 203 and cushion 204 protrude more than adjustment shim 202 toward the holder attachment surface 114 side. A recess that accommodates shim fastening screw 203 is formed at a location on holder attachment surface 114 corresponding to shim fastening screw 203, and cushion 204 is deformed. Therefore, phosphor holder attachment surface 201-1 is in contact with holder attachment surface 114 through adjustment shim 202 attached to phosphor holder attachment surface 201-1.

As described above, the thicknesses of adjustment shims 202 formed on phosphor holder attachment surfaces 201-1 to 201-4 are determined to cancel errors about the inclination of phosphor wheel 113 and the distance to condenser lens 110. Therefore, in light source device 100 of the present example embodiment, the formation surface of phosphor wheel 113 on which phosphor 401 is formed is perpendicular to the incident excitation light, the intensity of the output light of the light source device in which fluorescence is combined does not fluctuate, and the ratio of the fluorescence in the output light fluctuates and consequently the hue of the output light does not fluctuate.

Second Example Embodiment

FIG. 8 is a block diagram showing a configuration of an example embodiment of a projection type display device including the light source device described in the first example embodiment.

Projection type display device 1100 includes light source 1101 including the light source device described in the first example embodiment, optical engine section 1102, image forming unit 1103, and projection lens (projection optical system) 1104.

Image forming unit 1103 includes display devices 1105 to 1107 that modulate light according to an image signal, and has a function of forming an image based on light emitted from optical engine section 1102. In the present example embodiment, a digital micro-mirror device (DMD) which is a reflective display element is used as each of display devices 1105 to 1107. Further, in the present example embodiment, image forming unit 1103 includes three display devices 1105 to 1107 corresponding to red light, green light, and blue light. Projection lens 1104 has a function of projecting the light emitted from image forming unit 1103 onto screen 1109 or the like and displaying the light as an image.

In addition, projection type display device 1100 includes a cooling device for cooling the DMDs of the image forming unit.

In the projection type display device of the present example embodiment having the above configuration, since the intensity and hue of output light of light source device 1101 are stable, image light of projection type display device 1100 using light source device 1101 has a stable hue.

EXPLANATION OF REFERENCE NUMBERS

100 Light Source device
101 to 103 Laser light sources
104 to 106 Dichroic mirrors
107 to 110 Condenser lenses,
111 Phosphor holder
112 Motor
113 Phosphor wheel
205 Pedestal
115 Base
201-1 to 201-4 Phosphor holder attachment surfaces
202 Adjustment shim

The invention claimed is:

1. A phosphor holder that is attached to a holder attachment surface of a light source device, the phosphor holder comprising:
   a pedestal;
   a plurality of phosphor holder attachment surfaces that are provided at a plurality of points on an outer peripheral section of said pedestal and that protrude in a first direction by a predetermined height with respect to surroundings;
   a base that is mounted substantially in a center of a surface of said pedestal facing in the first direction;
   a motor that is mounted on said base and that has a rotating shaft substantially orthogonal to an in-plane direction of said pedestal;
   a phosphor wheel on which a phosphor is formed and that is rotated by said motor; and
   a plurality of adjustment shims that are mounted on said plurality of phosphor holder attachment surfaces and that are brought into contact with said holder attachment surface.

2. The phosphor holder according to claim 1, wherein each of said plurality of adjustment shims has a thickness that is set so that in a vicinity of each of said plurality of phosphor holder attachment surfaces on which said plurality of adjustment shims are attached, a distance from said pedestal to said phosphor wheel becomes a predetermined distance.

3. The phosphor holder according to claim 1, wherein a plurality of adjustment shims are mounted on at least one of said plurality of phosphor holder attachment surfaces.

4. The phosphor holder according to claim 1, wherein said plurality of phosphor holder attachment surfaces are disposed around a center of said phosphor wheel.

5. The phosphor holder according to claim 1, wherein the phosphor holder includes a cushion that is formed on said pedestal to surround said phosphor wheel, the cushion being formed of a deformable elastic member and protruding in the first direction more than said adjustment shims.

6. The phosphor holder according to claim 5, wherein said cushion is provided between said base and said plurality of phosphor holder attachment surfaces.

7. A light source device including a holder attachment surface to which the phosphor holder according to claim 5 is attached, wherein said holder attachment surface is formed with an opening that allows insertion of said phosphor wheel and is smaller than said cushion.

8. The light source device according to claim 7, further comprising:
   a laser light source for excitation that irradiates excitation light perpendicular to said holder attachment surface toward said phosphor wheel;
   first and second laser light sources that output first laser light and second laser light; and
   a combining optical system that combines fluorescence generated by the irradiation of the excitation light and the first laser light and second laser light outputted by said first and second laser light sources, and outputs the combined light.

9. A projection type display device comprising the light source device according to claim 7.

10. A light source device including a holder attachment surface to which the phosphor holder according to claim 1 is attached, wherein said holder attachment surface is formed with an opening that allows insertion of said phosphor wheel.

11. The light source device according to claim 10, further comprising:
   a laser light source for excitation that irradiates excitation light perpendicular to said holder attachment surface toward said phosphor wheel;
   first and second laser light sources that output first laser light and second laser light; and
   a combining optical system that combines fluorescence generated by the irradiation of the excitation light and the first laser light and second laser light outputted by said first and second laser light sources, and outputs the combined light.

12. A projection type display device comprising the light source device according to claim 10.

* * * * *